United States Patent
Kim et al.

(10) Patent No.: US 7,078,132 B2
(45) Date of Patent: Jul. 18, 2006

(54) LITHIUM BATTERY HAVING EFFECTIVE PERFORMANCE

(75) Inventors: Kwang-Chun Kim, Seoul (KR); Jin-Sung Kim, Cheonan-si (KR); Min-Ho Song, Cheonan-si (KR); Jang-Ho Yoon, Cheonan-si (KR); Teak-Hyen Kwon, Gangneung-si (KR); Jin-Uk Lee, Asan-si (KR); Chang-Seob Kim, Cheonan-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 5 days.

(21) Appl. No.: 10/938,538

(22) Filed: Sep. 13, 2004

(65) Prior Publication Data

US 2005/0095507 A1    May 5, 2005

(30) Foreign Application Priority Data

Oct. 29, 2003    (KR)    ................ 10-2003-0075821

(51) Int. Cl.
*H01M 10/40* (2006.01)
*H01M 4/52* (2006.01)

(52) U.S. Cl. ............... 429/331; 429/332; 429/231.1; 429/231.3

(58) Field of Classification Search ............... None
See application file for complete search history.

(56) References Cited

U.S. PATENT DOCUMENTS

| 5,686,138 A | 11/1997 | Fujimoto et al. |
| 6,503,657 B1 | 1/2003 | Takami et al. |
| 2004/0197667 A1* | 10/2004 | Noh et al. ............... 429/326 |
| 2005/0026043 A1* | 2/2005 | Kang et al. ............... 429/330 |

FOREIGN PATENT DOCUMENTS

| JP | 59-203369 | 11/1984 |
| JP | 06-020721 | 1/1994 |
| JP | 07-153486 | 6/1995 |
| JP | 07-176323 | 7/1995 |
| JP | 07-320779 | 12/1995 |
| JP | 08-064242 | 3/1996 |
| JP | 08-321313 | 12/1996 |
| JP | 09-073918 | 3/1997 |
| KR | 10-2001-0082428 | 8/2001 |
| KR | 10-2003-0031396 | 4/2003 |

OTHER PUBLICATIONS

C.R. Yang, et al.; "Composition analysis of the passive film on the carbon electrode of a lithium-ion battery with an EC-based electrolyte"; Journal of Power Sources 72, pp. 66-70; ELSEVIER (1998), no month.
Korean Office Action of the Korean Patent Application No. 2003-0075821, mailed on Oct. 28, 2005.

* cited by examiner

*Primary Examiner*—John S. Maples
(74) *Attorney, Agent, or Firm*—Robert E. Bushnell, Esq.

(57) ABSTRACT

A lithium battery which has an anode, a cathode having a compound capable of intercalating and deintercalating lithium, a separator interposed between the cathode and the anode, and an electrolyte solution having an electrolyte solute dissolved in a nonaqueous solvent. The nonaqueous solvent includes a mixed solvent containing 8 to 15% by volume of ethylene carbonate, 10 to 35% by volume of γ-butyrolactone, 35 to 65% by volume of at least one linear carbonate selected from the group consisting of dimethyl carbonate, diethyl carbonate, ethylmethyl carbonate, methylpropyl carbonate, ethylpropyl carbonate and methylbutyl carbonate and 8 to 15% by volume of fluorobenzene, and 0.5 to 9 parts by volume of vinylene carbonate based on 100 parts by volume of the mixed solvent. The nonaqueous solvent may further include 0.05 to 5 parts by volume of vinyl sulfone, isooxazole or a mixture thereof based on 100 parts by volume of the mixed solvent.

20 Claims, 4 Drawing Sheets

LITHIUM BATTERY HAVING EFFECTIVE PERFORMANCE

CLAIM OF PRIORITY

This application claims all benefits accruing under 35 U.S.C. §119 from Korean Patent Application entitled "LITHIUM BATTERY HAVING EFFECTIVE PERFORMANCE", assigned serial No. 2003-75821, filed on Oct. 29, 2003, in the Korean Intellectual Property Office, the disclosure of which is incorporated herein in its entirety by reference.

BACKGROUND OF THE INVENTION

1. Field of the Invention

The present invention relates to a lithium battery, and, more particularly, to a lithium battery using a non-aqueous solvent for extended charge/discharge cycle life, improved high-temperature storage stability and improved low-temperature discharge characteristics.

2. Description of the Related Art

Lithium batteries that are widely being used as power supplies for portable electronic devices such as notebook computers, camcorders or mobile phones, include a cathode containing a lithium metal composite oxide or sulfur capable of intercalating and deintercalating lithium ions, an anode containing a carbon material or lithium metal, and an electrolytic solution having an appropriate amount of a lithium salt dissolved in a non-aqueous mixed solvent.

The average discharge voltage of lithium batteries is in a range of about 3.6 to about 3.7 V, which is relatively higher than that of other alkali batteries or nickel-cadmium batteries. In order to attain such a high operating voltage, it is necessary to form an electrolytic solution that is electrochemically stable at a charge/discharge voltage area in a range of 0 to 4.2 V. To this end, a mixed solvent having a cyclic carbonate such as ethylene carbonate or propylene carbonate, and a linear carbonate such as dimethyl carbonate, ethylmethyl carbonate or diethyl carbonate, mixed in each appropriate amount, is used as a solvent for the electrolytic solution. A lithium salt such as $LiPF_6$, $LiBF_4$ or $LiClO_4$ is typically used as a solute for the electrolytic solution, and serves as a source of lithium ions in a cell, allowing the lithium battery to operate.

During an initial charge stage of a lithium battery, lithium ions in a cathode active material such as lithium metal composite oxide move to an anode active material such as graphite and are intercalated between lattice planes of the anode active material. Since lithium ions are highly reactive, the lithium ions in the electrolytic solution react with carbon of the anode active material such as graphite on the surface of the anode active material, thus producing compounds such as $Li_2CO_3$, $Li_2O$, LiOH or the like. These compounds form a solid electrolyte interface (SEI) film on the surface of the anode active material such as graphite.

The SEI film works as an ion tunnel and allows only lithium ions to pass through. The SEI film working as an ion tunnel prevents a laminated structure of an anode from being disintegrated by intercalation of high molecular weight organic solvent molecules moving with lithium ions in the electrolytic solution to the anode active material. Thus, the electrolytic solution and the anode active material do not contact each other by the SEI film, so that the electrolytic solution is not decomposed by intercalation of high molecular weight organic solvent molecules and the amount of lithium ions in the electrolytic solution is reversibly maintained, thereby ensuring stable charge and discharge.

In a thin prismatic type battery, however, the thickness of the battery may increase during charging due to a gas such as CO, $CO_2$, $CH_4$, $C_2H_6$ or the like generated when a carbonate-based solvent is decomposed during formation of the SEI film, as described in C. R. Yang, Y. Y. Wang and C. C. Wan, J. Power Sources, pages 66–70, Vol. 72, 1998.

When a battery is stored at high temperature in a fully charged state, the SEI film slowly decays due to increased electrochemical energy and thermal energy. Thus, side reactions of an electrolytic solution at an exposed surface of and around an anode may continuously occur so that gas is continuously generated inside the battery, resulting in an increase in the internal pressure of the battery. Consequently, a prismatic type or pouch type battery may become bulky, impairing stability of a portable electronic device such as a mobile phone, a notebook type computer or the like, when stored at high temperature.

To suppress an increase in the internal pressure of a battery, research into techniques for changing phases in the reaction for forming an SEI film by adding an additive to an electrolytic solution, has been carried out. One example of such research is found in Japanese Patent Laid-Open Publication No. Hei 07-176323 disclosing an electrolytic solution having $CO_2$ added thereto. Japanese Patent Laid-Open Publication No. Hei 07-320779 discloses a technique of suppressing decomposition of an electrolytic solution by adding a sulfide-based compound thereto. Japanese Patent Laid-Open Publication No. Hei 09-73918 discloses a battery having improved high-temperature storage stability using diphenyl picryl hydrazyl (DPPH). Japanese Patent Laid-Open Publication No. Hei 08-321313 discloses a battery having an improved charge/discharge cycle by adding a specific compound to an electrolytic solution.

To date, it has been known that a specific compound added to an electrolytic solution for the purpose of enhancing battery performance may improve some factors but may degrade other factors in view of battery performance.

A nonaqueous solvent contained in a conventional lithium battery employs a mixed solvent having a large amount of ethylene carbonate as a cyclic carbonate compound having a high dielectric constant and an appropriate amount of low-viscosity linear carbonate compound such as dimethyl carbonate or diethyl carbonate. For example, U.S. Pat. No. 5,686,138 discloses a lithium secondary battery using a nonaqueous solvent comprising 20 to 80% by volume of ethylene carbonate. In such a lithium battery comprising a large amount of ethylene carbonate, however, an SEI film is structurally unstable, resulting in a sharp increase of the internal pressure of the battery.

Since ethylene carbonate has a relatively high freezing point, i.e., 37 to 39° C., it is at a solid state at room temperature, meaning that its ion conductivity is low at low temperature. Thus, a lithium battery using a nonaqueous solvent comprising a large amount of ethylene carbonate has poor low-temperature conductivity. To solve this problem, methods for providing a lithium secondary battery having good high-rate discharge characteristics at low temperature have been proposed. Japanese Patent Laid-Open Publication No. Hei 07-153486 discloses a lithium secondary battery using an electrolytic solution comprising 0.5 to 50% by volume of γ-butyrolactone and a mixture of ethylene carbonate and dimethyl carbonate in a volume ratio of 1:1. Although adding γ-butyrolactone improves high-rate discharge characteristics at low temperature, life characteristics of a battery may deteriorate.

To suppress swelling of a battery due to gases generated when left at high temperature and improve high-capacity discharge characteristics and charge/discharge cycle life characteristics of a battery, U.S. Pat. No. 6,503,657 discloses a nonaqueous electrolyte secondary battery using a nonaqueous solvent comprising 5 to 40% by volume of ethylene carbonate, 40 to 95% by volume of γ-butyrolactone and 0.05 to 10% by volume of vinylene carbonate. However, if the amount of γ-butyrolactone unduly increases, life characteristics of a battery may deteriorate.

To provide a high-capacity nonaqueous secondary battery, Japanese Patent Laid-Open Publication No. Hei 06-20721 discloses a nonaqueous secondary battery comprising a carbonaceous cathode including graphite having d-value ($d_{002}$) of the lattice plane (002) obtained by X-ray diffraction of less than 0.337, 20 to 50% by volume of γ-butyrolactone and a remainder of cyclic carbonates. However, since the nonaqueous solvent does not contain linear carbonates, the viscosity of an electrolytic solution is high so that the ion conductivity is low, and low-temperature discharge capacity may deteriorate.

To provide a nonaqueous secondary battery having excellent low-temperature characteristics, Japanese Patent Laid-Open Publication No. Hei 08-64242 discloses a nonaqueous secondary battery using a mixed solvent comprising 10 to 50% by volume of γ-butyrolactone and/or sulfolane, and 90 to 50% by volume of dimethyl carbonate. However, the nonaqueous electrolytic solution system of the secondary battery has a low dielectric constant, resulting in poor life characteristics of the battery.

Therefore, it is highly demanded to develop a lithium battery which can exhibit improved charge/discharge cycle characteristics, effective high-temperature storage stability and effective low-temperature discharge characteristics by varying compositions of a nonaqueous mixed solvent used for an electrolytic solution of a conventional lithium battery.

SUMMARY OF THE INVENTION

It is therefore an object of the present invention to provide an improved lithium battery.

It is also an object of the present invention to provide a lithium battery which can exhibit improved charge/discharge cycle characteristics, effective high-temperature storage stability and effective low-temperature discharge characteristics.

It is another object of the present invention to provide an improved electrolytic solution for the lithium battery.

In order to achieve the above and other objectives, the first preferred embodiment of the lithium battery comprises an anode, a cathode, a separator, and an electrolytic solution. The anode preferably comprises mainly a carbon material. The cathode comprises mainly a compound capable of intercalating and deintercalating lithium. The separator is interposed between the cathode and the anode. The electrolytic solution has an electrolyte solute dissolved in a nonaqueous solvent, which comprises a mixed solvent containing 8 to 15% by volume of ethylene carbonate, 10 to 35% by volume of γ-butyrolactone, 35 to 65% by volume of at least one linear carbonate selected from the group consisting of dimethyl carbonate, diethyl carbonate, ethylmethyl carbonate, methylpropyl carbonate, ethylpropyl carbonate and methylbutyl carbonate and 8 to 15% by volume of fluorobenzene, and 0.5 to 9 parts by volume of vinylene carbonate based on 100 parts by volume of the mixed solvent.

In the second preferred embodiment of the present invention, there is provided a lithium battery comprising an anode, a cathode, a separator, and an electrolytic solution. The anode preferably comprises mainly a carbon material. The cathode comprises mainly a compound capable of intercalating and deintercalating lithium. The separator is disposed between the anode and the cathode. The electrolyte solution has an electrolyte solute dissolved in a nonaqueous solvent, which comprises a mixed solvent containing 8 to 15% by volume of ethylene carbonate, 10 to 35% by volume of γ-butyrolactone, 35 to 65% by volume of linear carbonate selected from the group consisting of dimethyl carbonate, diethyl carbonate, ethylmethyl carbonate, methylpropyl carbonate, ethylpropyl carbonate and methylbutyl carbonate, and 8 to 15% by volume of fluorobenzene, 0.5 to 9 parts by volume of vinylene carbonate based on the volume of the mixed solvent, and 0.05 to 5 parts by volume of vinyl sulfone, isooxazole or a mixture thereof based on 100 parts by volume of the mixed solvent.

As described above, the nonaqueous solvent for a lithium battery according to the invention includes not more than 15% by volume of ethylene carbonate, which is quite a small amount compared to a composition of the conventional nonaqueous solvent, while satisfying various characteristics required for lithium batteries that can be commercially acceptable. In more detail, the nonaqueous solvent used for a lithium battery according to the invention comprises vinylene carbonate dissolved alone or in combination with vinyl sulfone, isooxazole or a mixture thereof in a mixed solvent containing ethylene carbonate and γ-butyrolactone for a high dielectric constant, linear carbonate for low viscosity, and fluorobenzene for high ion conductivity.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
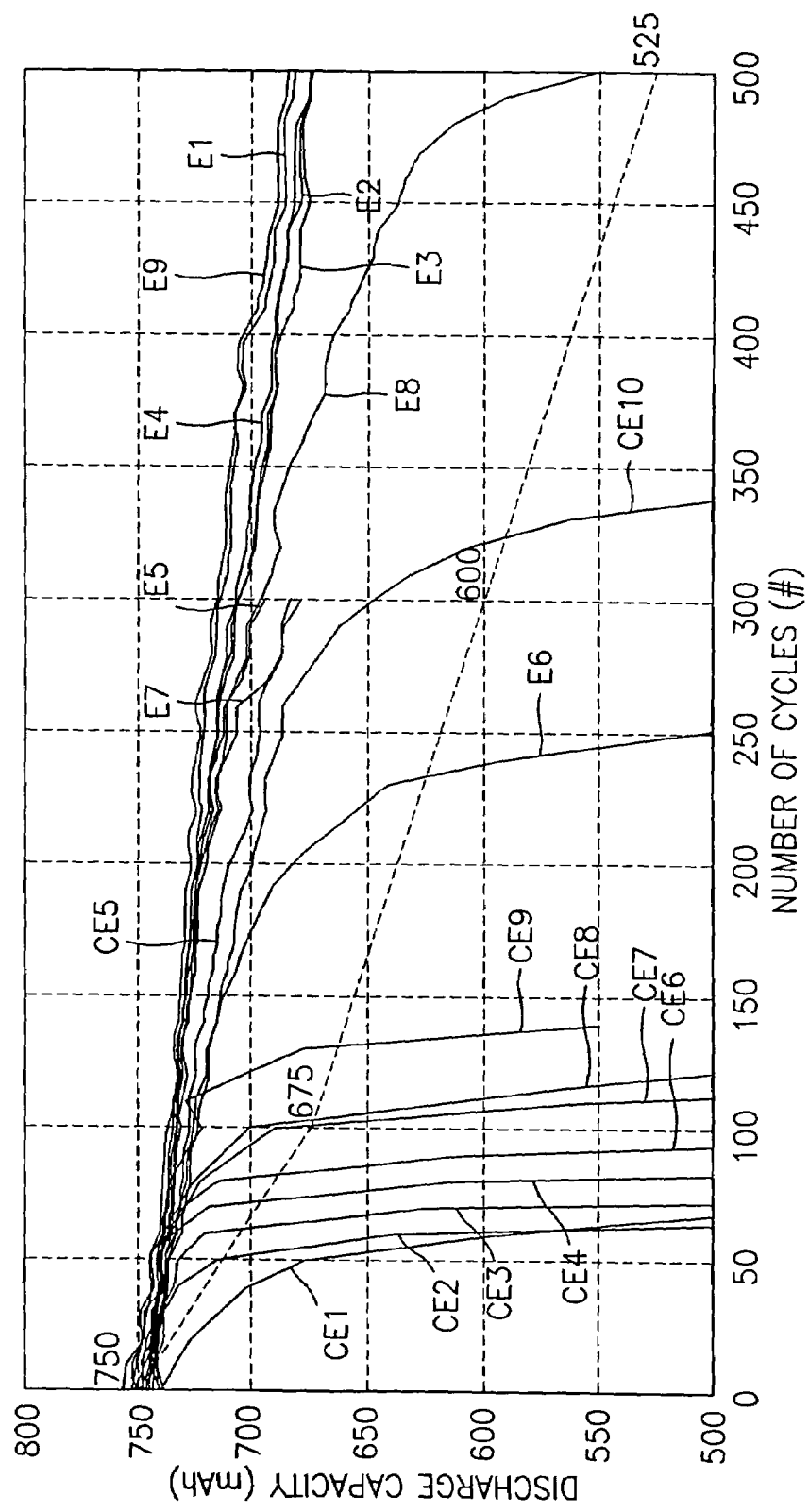
FIG. 1 is a graph showing the results of charge/discharge cycle life test for lithium batteries manufactured in Examples 1 through 9 and Comparative Examples 1 through 10.

A lithium battery according to the present invention will now be described in more detail.

The lithium battery according to the first embodiment of the present invention includes an anode, a cathode, a separator, and an electrolyte solution. The anode is preferably composed mainly of a carbon material. The cathode is composed mainly of a compound capable of intercalating and deintercalating lithium. The separator is interposed between the cathode and the anode. The electrolyte solution has an electrolyte solute dissolved in a nonaqueous solvent. The nonaqueous solvent includes a mixed solvent containing 8 to 15% by volume of ethylene carbonate (EC), 10 to 35% by volume of γ-butyrolactone (GBL), 35 to 65% by volume of at least one linear carbonate selected from the group consisting of dimethyl carbonate (DMC), diethyl carbonate (DEC), ethylmethyl carbonate (EMC), methylpropyl carbonate (MPC), ethylpropyl carbonate (EPC) and methylbutyl carbonate (MBC) and 8 to 15% by volume of fluorobenzene (FB), and 0.5 to 9 parts by volume of vinylene carbonate (VC) based on 100 parts by volume of the mixed solvent.

The anode has a stacked structure in which an anode active material layer is stacked on an anode plate, e.g., a copper foil, by a binder. Examples of the anode active material include, but not limited to, crystalline carbon, amorphous carbon, crystalline graphite, amorphous graphite or combinations thereof. Preferred examples of the binder include polyvinylidene fluoride (PVDF), a copolymer of vinylidene fluoride and hexafluoropropylene, styrene-butadien rubber (SBR), and polyacrylonitrile, etc. In the anode active material layer, a relative weight ratio of the anode active material to the binder is preferably in a range of 90:10 to 98:2. If the relative weight of the anode active material is less than 90, a discharge capacity of a battery is insufficient. If the relative weight of the binder is less than 2, adhesion between the anode plate and the anode active material layer is insufficient. To improve conductivity, if necessary, the anode active material layer may further include conductive particles such as carbon black, acetylene black or ketene black, in a conventionally acceptable amount. In addition, to promote a preparation process, the anode active material layer may further include additives that have been conventionally used. Usable examples of the additives include oxalic acid, maleic acid and the like.

The cathode has a stacked structure in which a cathode active material layer is stacked on a cathode plate, e.g., an aluminum or aluminum alloy foil. In the cathode active material layer, a cathode active material and conductive particles are stacked on the cathode plate by a binder. The cathode active material must have a function of intercalating and deintercalating lithium. The cathode active material may be a lithium composite oxide, preferably, $Li_xMO_2$ or $Li_yM_2O_4$ (where M is a transition element, $0 \leq x \leq 1$ and $0 \leq y \leq 2$). More preferably, the cathode active material is at least one selected from the group consisting of $LiCoO_2$, $LiMnO_2$, $LiNiO_2$, $LiCrO_2$ and $LiMn_2O_4$, etc. In addition, sulfur or a sulfur-containing compound may be used as the cathode active material. The conductive particles used for the cathode active material layer are preferably at least one selected from the group consisting of carbon black, acetylene black and keten black, like in the case of the anode active material. Preferred examples of the binder include PVDF, a vinylidene fluoride-hexafluoropropylene (VDF-HFP) copolymer, SBR and the like, like in the anode active material layer.

In the cathode active material layer, a relative weight ratio of the cathode active material to the binder is preferably in a range of 90:10 to 98:2. To promote a preparation process, the cathode active material layer may further include additives that have been conventionally used. Usable examples of the additives include alkoxide compounds, boron based compounds and the like.

A separator is interposed between the cathode and the anode. The separator not only prevents electrical short between the cathode and the anode but also provides a movement passage of lithium ions. Suitable examples of the separator useful in the present invention include a polyolefin-based separator, fluorinated polyolefin-based separator, fluorine resin based separator such as a polyethylene separator, a polypropylene separator, a polyvinylidene fluoride separator, a VDF-HFP copolymer separator, a polyethylene/polypropylene bilayer separator, a polypropylene/polyethylene/polypropylene triple layer separator or a polyethylene/polypropylene/polyethylene triple layer separator, and the like.

An electrolytic solution is impregnated into an electrode unit having the anode, the separator and the cathode. The electrolytic solution includes a nonaqueous solvent and an electrolyte solute dissolved in the nonaqueous solvent.

The electrolyte solute is preferably selected from the group consisting of $LiPF_6$, $LiBF_4$, $LiClO_4$, $LiCF_3SO_3$, $LiC_4F_9SO_3$, $LiN(CF_3SO_2)_2$ and $LiAsF_6$. The electrolyte solute is preferably used at a concentration in a range of 0.8 to 2.5 M. If the concentration of the electrolyte solute is less than 0.8 M, or greater than 2.5 M, life characteristics of a battery may deteriorate.

The non-aqueous solvent used for the lithium battery according to the first embodiment of the present invention comprises a mixed solvent containing 8 to 15% by volume of ethylene carbonate, 10 to 35% by volume of γ-butyrolactone, 35 to 65% by volume of at least one linear carbonate selected from the group consisting of dimethyl carbonate, diethyl carbonate, ethylmethyl carbonate, methylpropyl carbonate, ethylpropyl carbonate and methylbutyl carbonate and 8 to 15% by volume of fluorobenzene, and 0.5 to 9 parts by volume of vinylene carbonate based on 100 parts by volume of the mixed solvent.

Since ethylene carbonate has a high dielectric constant, it has been generally used in a large amount, generally 20 to 80% by volume, in order to obtain greater than or equal to a predetermined level of dielectric constant. However, if ethylene carbonate is contained in the nonaqueous solvent in a large amount, because of its high freezing point, that is, 37 to 39° C., the ion conductivity of the electrolytic solution at low temperature may deteriorate, resulting in deterioration of discharge characteristics at low temperature.

According to the present invention, the nonaqueous solvent system comprises ethylene carbonate at a low amount of 8 to 15% by volume, preferably, 10 to 15% by volume. To compensate for a reduction in the dielectric constant of the nonaqueous solvent system due to a reduction in the amount of ethylene carbonate, the nonaqueous solvent system according to the present invention comprises 10 to 35%, preferably 15 to 25%, by volume of γ-butyrolactone, which has a relatively high dielectric constant. Since γ-butyrolactone has a low freezing point of −45° C., it has a low-temperature ion conductivity greater than that of ethylene carbonate and can alleviate swelling occurring when the battery is stored at high temperature for an extended period of time. Also, since it has lower viscosity than ethylene carbonate, it can be advantageously used in view of low temperature discharge characteristics.

In the nonaqueous solvent used for the lithium battery according to the first embodiment of the present invention, if the amount of ethylene carbonate is less than 8% by volume and the amount of γ-butyrolactone is less than 10% by volume, the shortage gives rise to a deterioration of cycle life characteristics due to a small dielectric constant of the nonaqueous solvent system. If the amount of ethylene carbonate is greater than 15% by volume and the amount of γ-butyrolactone is greater than 35% by volume, the excess may result in a sharp increase in the viscosity of the nonaqueous solvent system, so that the lithium ion conductivity is reduced and the cycle life and discharge characteristics of the battery may deteriorate.

The nonaqueous solvent used for the lithium battery according to the embodiment of the present invention comprises 35 to 65% by volume of at least one linear carbonate selected from the group consisting of dimethyl carbonate, diethyl carbonate, ethylmethyl carbonate, methylpropyl carbonate, ethylpropyl carbonate and methylbutyl carbonate. If the amount of the linear carbonate is less than 35% by volume, the resistance of the battery may increase and the low temperature discharge characteristic of the battery may deteriorate. If the amount of the linear carbonate is greater than 65% by volume, the thickness of the battery when stored at high temperature may increase and the safety of the battery may be impaired.

The nonaqueous solvent used for the lithium battery according to the first embodiment of the present invention also comprises 8 to 15% by volume of fluorobenzene, which is included in the nonaqueous solvent system in order to improve the low temperature characteristic and charge/discharge cycle characteristic of the battery. If the amount of fluorobenzene is less than 8% by volume, the effect of improving the low temperature characteristic is negligible. If the amount of fluorobenzene is greater than 15% by volume, the excess gives rise to an increase in the thickness of the battery when stored at high temperature and the safety of the battery may be impaired.

The nonaqueous solvent used for the lithium battery according to the first embodiment of the present invention also comprises 0.5 to 9 parts, preferably 1 to 3 parts, more preferably 1 to 2 parts, by volume of vinylene carbonate based on 100 parts by volume of the mixed solvent, as described above. Adding vinylene carbonate to the nonaqueous solvent system according to the present invention can remedy poor cycle life characteristics of the battery due to a reduction in the content of ethylene carbonate and a large amount of γ-butyrolactone. This is presumably because vinylene carbonate can form a new SEI film when an SEI film is decayed due to repeated shrinkage and expansion of the anode active material during charge and discharge cycles, thereby preventing decomposition of an electrolytic solution. Although adding vinylene carbonate improves cycle life characteristics of the battery, the extent of swelling of the battery when stored at high temperature for an extended period of time may increase.

In the non-aqueous solvent used for the lithium battery according to the first embodiment of the present invention, if the amount of vinylene carbonate is less than 0.5 parts by volume, the effect of adding vinylene carbonate cannot be exerted substantially. If the amount of vinylene carbonate is greater than 9 parts by volume, the extent of swelling of the battery when stored at high temperature for an extended period of time may exceed an allowable range.

The lithium battery of the first embodiment may further include 8 to 15% by volume of at least one selected from the group consisting of propylene carbonate (PC), 1,2-butylene carbonate, 2,3-butylene carbonate, 1,2-pentene carbonate and 2,3-pentene carbonate.

In the second embodiment of the present invention, there is provided a lithium battery comprising an anode composed mainly of a carbon material, a cathode composed mainly of a compound capable of intercalating and deintercalating lithium, a separator disposed between the anode and the cathode, and an electrolyte solution of an electrolyte solute dissolved in a nonaqueous solvent, the nonaqueous solvent comprising a mixed solvent including 35 to 65% by volume of linear carbonate selected from the group consisting of dimethyl carbonate, diethyl carbonate, ethylmethyl carbonate, methylpropyl carbonate, ethylpropyl carbonate and methylbutyl carbonate, and 8 to 15% by volume of fluorobenzene, 0.5 to 9 parts by volume of vinylene carbonate based on the volume of the mixed solvent, and 0.05 to 5 parts by volume of vinyl sulfone (VS), isooxazole (ISO) or a mixture thereof based on 100 parts by volume of the mixed solvent.

The anode, the cathode and the separator used in the lithium battery according to the second embodiment of the present invention are the same as those of the lithium battery according to the first embodiment of the present invention, and an explanation thereof will not be given.

Examples of the nonaqueous solvent used in the lithium battery according to the second embodiment of the present invention include a mixed solvent containing 8 to 15% by volume of ethylene carbonate, 10 to 35% by volume of γ-butyrolactone, 35 to 65% by volume of at least one linear carbonate selected from the group consisting of dimethyl carbonate, diethyl carbonate, ethylmethyl carbonate, methylpropyl carbonate, ethylpropyl carbonate and methylbutyl carbonate and 8 to 15% by volume of fluorobenzene, and 0.5 to 9 parts by volume of vinylene carbonate and 0.05 to 5 parts by volume of vinyl sulfone, isooxazole or a mixture thereof based on 100 parts by volume of the mixed solvent.

Compared to the non-aqueous solvent used in the lithium battery according to the first embodiment of the present invention, the non-aqueous solvent used in the lithium battery according to the second embodiment of the present invention further includes vinyl sulfone, isooxazole or a mixture thereof, by which swelling of the battery, which may occur due to use of vinyl carbonate when the battery is stored at high temperature, can be suppressed.

The lithium battery according to the second embodiment of the present invention can effectively maintain a low temperature discharge characteristic, charge and discharge cycle life characteristic and high temperature storage stability (that is, suppressed swelling and ensured safety of the battery when stored at high temperature for a long time) by employing the non-aqueous solvent including the mixed solvent according to the first embodiment of the present invention and further comprising vinyl sulfone, isooxazole or a mixture thereof in addition to vinylene carbonate.

The amount of vinyl sulfone, isooxazole or a mixture thereof is preferably in a range of 0.05 to 5 parts, more preferably 0.07 to 2 parts, most preferably 0.1 to 0.5 parts by volume based on 100 parts by volume of the mixed solvent. If the amount is less than 0.05 parts by volume, the effect of adding vinyl sulfone and/or isooxazole cannot be substantially exerted. If the amount is greater than 5 parts by volume, the SEI film is excessively formed so that the resistance of the battery may increase, resulting in deterioration of life characteristics of the battery. As described above, swelling of the battery, which may occur when the battery is stored at high temperature, can be suppressed by adding vinyl sulfone and/or isooxazole to the mixed solvent. This is presumably because adding vinyl sulfone and/or isooxazole allows an anode SEI film to be solid so that the amount of gases generated by decomposition of an electrolytic solution due to a contact between the anode and the electrolytic solution when the lithium battery is stored at high temperature may be decreased.

The lithium battery of the second embodiment may further include 8 to 15% by volume of at least one selected from the group consisting of propylene carbonate, 1,2-butylene carbonate, 2,3-butylene carbonate, 1,2-pentene carbonate and 2,3-pentene carbonate.

There is no restrictions in the shape of the lithium battery according to the present invention and the present invention can be applied to batteries of various known types including a coin type, a button type, a prismatic type, a cylindrical type, a pouch type and the like.

A lithium battery according to the present invention and a method for manufacturing the lithium battery will be described below in greater detail with reference to the following examples. It will be understood by those skilled in the art that the following examples further illustrate the present invention in detail but are not to be construed to limit the scope thereof.

EXAMPLE 1

To 100 ml of a mixed solvent containing ethylene carbonate(EC), γ-butyrolactone (GBL), ethylmethyl carbonate (EMC) and fluorobenzene (FB) in a volume ratio of 15:25:50:10 was added 2 ml of vinylene carbonate (VC), and $LiPF_6$ was dissolved therein in a concentration of 1.0 M, thereby preparing a nonaqueous electrolytic solution.

A 463450 prismatic type battery was manufactured using the prepared nonaqueous solvent by a general manufacturing method.

That is, 92 g $LiCoO_2$ as a cathode active material, 4 g polyvinylidene fluoride (to be referred to as "PVDF") as a binder, 4 g carbon black (Product name: "Super-P") as a conductive agent were dissolved in 23 g N-methyl-2-pyrrolydone (NMP), followed by ball milling for about 5 hours to provide a cathode active material composition.

The cathode active material composition was coated onto a 20-μm-thick and 42.5-cm-wide aluminum foil using a 150-μm-gap doctor blade, subjected to drying and rolling, and cut into a cathode plate of a predetermined size.

In order to manufacture an anode plate, 92 g crystalline artificial graphite ("P15B", available from Japan Carbon Co.) as an anode active material and 8 g PVDF as a binder were dissolved in 50 g NMP, followed by ball milling for about 5 hours to provide an anode active material composition.

The anode active material composition was coated onto a 15-μm-thick and 44-cm-wide copper foil using a 145-μm-gap doctor blade, subjected to drying and rolling, and cut into the anode plate of a predetermined size.

A 25-μm-thick polyethylene separator ("MQA44B", available from Celgard) was interposed between the cathode plate and the anode plate, wound, rolled and put into a 34 mm×50 mm×4.2 mm prismatic type can, followed by impregnating with 2 ml of the nonaqueous electrolytic solution, thereby completing the 463450 prismatic type battery.

EXAMPLES 2 THROUGH 9

463450 prismatic type lithium batteries were manufactured in the same manner as in Example 1, except that compositions of the nonaqueous electrolytic solution were varied as shown in Table 1.

COMPARATIVE EXAMPLES 1 THROUGH 10

463450 prismatic type lithium batteries were manufactured in the same manner as in Example 1, except that compositions of the nonaqueous electrolytic solution were varied as shown in Table 1 so as not to fall within the ranges for the first and second embodiments of the present invention.

Charge/Discharge Cycle Life Test

The 463450 prismatic type lithium batteries manufactured in Examples 1–9 and Comparative Examples 1–10, each having nominal capacity of 780 mAh, were charged under conditions of a constant current and a constant voltage at a current of 160 mA for two and a half hours up to the battery voltage of 4.2 V, and were left to stand for 30 minutes, followed by discharging the batteries under the condition of a constant current of 160 mA to the final battery voltage of 3.0 V. The charge/discharge cycle was repeated and charge/discharge cycle life was measured. The measurement was performed at 25° C.

FIG. 1 is a graph showing the results of charge/discharge cycle life test for lithium batteries manufactured in Examples 1 through 9 and Comparative Examples 1 through 10. In FIGS. 1 to 4, "E" denotes "Example" and "CE" denotes "Comparative Example".

Referring to FIG. 1, the lithium batteries manufactured in Examples 1 through 9 using the nonaqueous solvent according to the present invention maintained approximately 80% or greater of the initial discharge capacity after 300 cycles, except that the lithium battery manufactured in Example 6 exhibited rather poorer cycle life performance than the lithium batteries manufactured in other Examples, which is still much better than that of the lithium batteries manufactured in most Comparative Examples. The battery capacity of the lithium batteries manufactured in Comparative Examples was substantially reduced after 300 cycles.

Swelling Test When Stored at High Temperature

The 463450 prismatic type lithium batteries manufactured in Examples 1–8 and Comparative Examples 1–8, each having nominal capacity of 780 mAh, were charged under conditions of a constant current and a constant voltage at a current of 160 mA for two and a half hours up to the battery voltage of 4.2 V, and were left to stand for 30 minutes, followed by storing the batteries in a chamber maintained at high temperature of 85° C.

Figure 2:
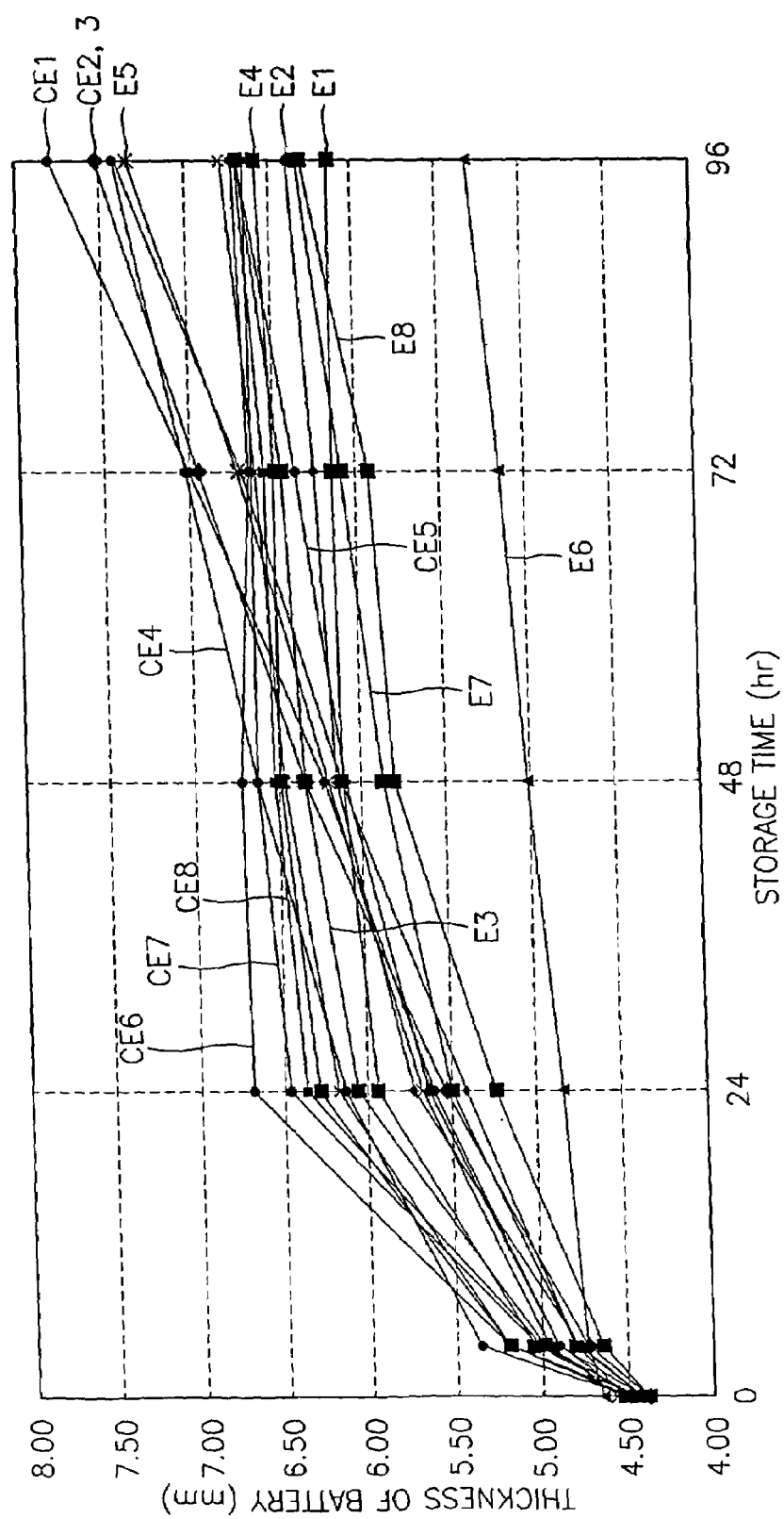
FIG. 2 illustrates a change in the thickness of lithium batteries manufactured in Examples 1 through 8 and Comparative Examples 1 through 8 while being left in a chamber maintained at high temperature of 85° C. at intervals of 4 or 24 hours for 4 days.

FIG. 2 illustrates a change in the thickness of lithium batteries manufactured in Examples 1 through 8 and Comparative Examples 1 through 8 while being left in a chamber maintained at high temperature of 85° C. at intervals of 4 or 24 hours for 4 days.

Referring to FIG. 2, when stored at high temperature of 85° C. for 4 days, the thickness of the lithium batteries manufactured in Examples 1 through 8 increased less than that of the lithium batteries manufactured in Comparative Examples 1 through 8 by as much as about 2.5 mm.

As described above, according to the present invention, suppressed swelling of a lithium battery stored at high temperature, is presumably because the gases generated inside the battery due to decomposition of an electrolytic solution are reduced.

High-Temperature Storage Stability

Figure 3:
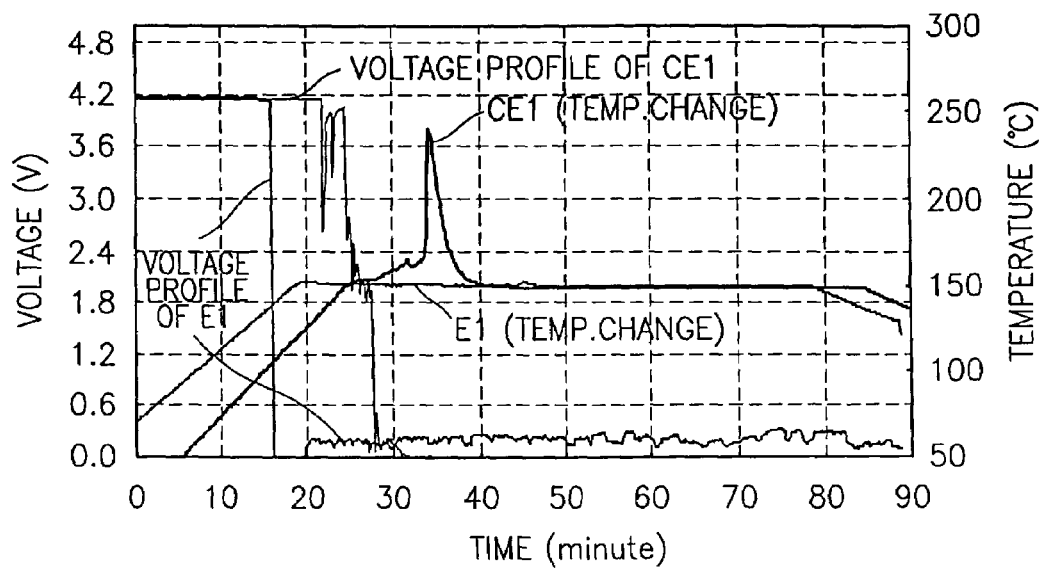
FIG. 3 illustrates measurement results of voltages and temperatures of lithium batteries manufactured in Example 1 and Comparative Example 1 while being left in an oven maintained at a temperature of 150° C. for one hour.

FIG. 3 illustrates measurement results of voltages and temperatures of the 463450 prismatic type batteries manufactured in Example 1 and Comparative Example 1 while being left in an oven maintained at a temperature of 150° C. for one hour after the batteries having nominal capacity of 780 mAh were charged under conditions of a constant current and a constant voltage at a current of 160 mA for 3 hours up to battery voltage of 4.2 V, and were left to stand for 1 hour in a chamber maintained at 150° C. The temperature of the chamber was raised up to 150° C. at a speed of 5° C./min.

Referring to FIG. 3, the lithium battery manufactured in Example 1 exhibited higher stability at high temperature than the battery manufactured in Comparative Example 1.

Low Temperature Discharge Characteristic

The 463450 prismatic type batteries manufactured in Examples 1–5 and 7–9 and Comparative Examples 1–4 and 6–10 having nominal capacity of 780 mAh, were charged under conditions of a constant current and a constant voltage at a current of 160 mA for 3 hours up to battery voltage of 4.2 V, and were left to stand at 25° C. for 30 minutes, followed by discharging in a chamber maintained at −20° C. under a constant current condition at a current of 160 mA down to a battery voltage of 3.0 V.

Figure 4:
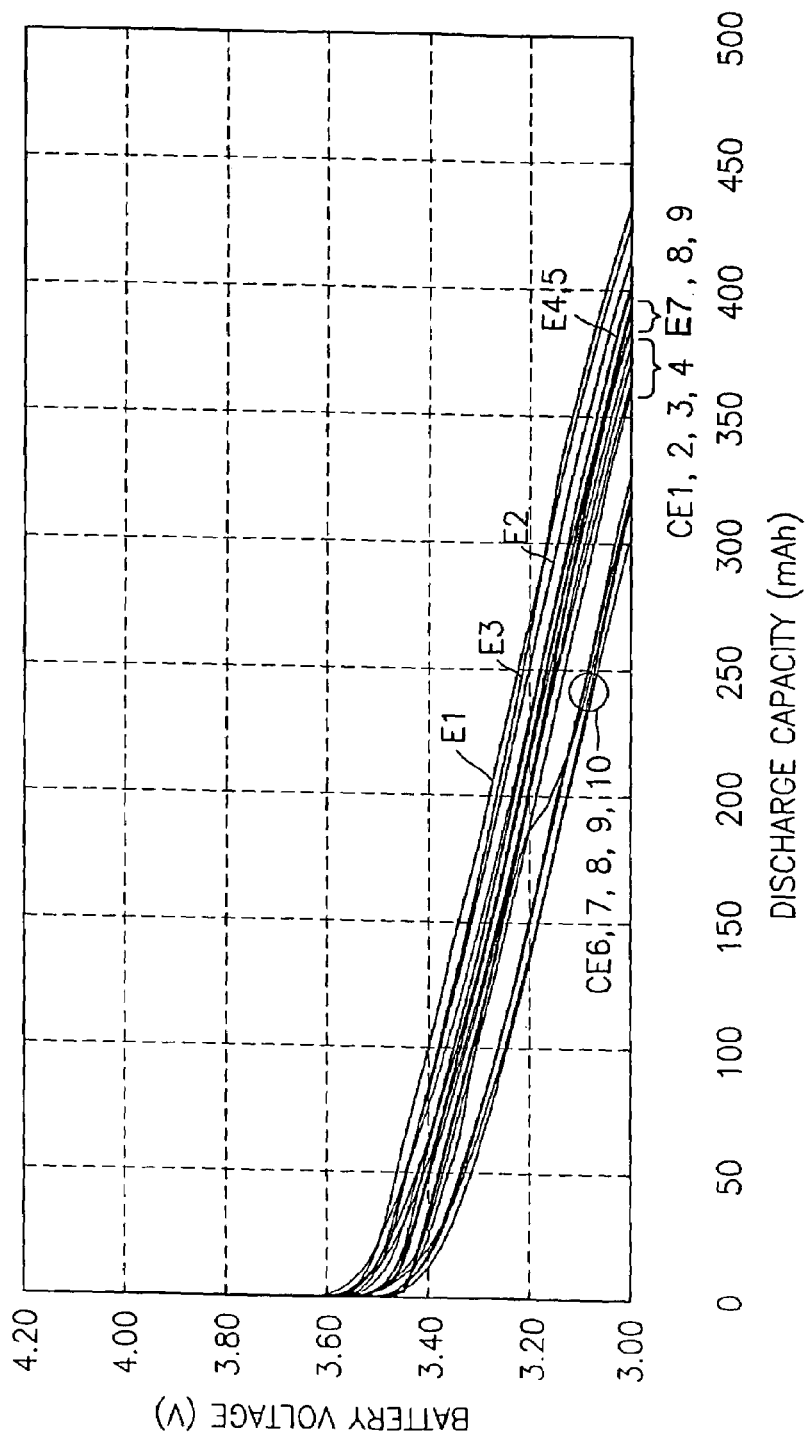
FIG. 4 illustrates measurement results of low temperature discharge characteristics of lithium batteries manufactured in Examples 1–5 and 7–9 and Comparative Examples 1–4 and 6–10.

FIG. 4 illustrates measurement results of low temperature discharge characteristics of lithium batteries manufactured in Examples 1–5 and 7–9 and Comparative Examples 1–4 and 6–10.

Referring to FIG. 4, the lithium batteries manufactured in Examples 1–5 and 7–9 had larger low-temperature discharge capacity than those manufactured in Comparative Examples 1–4 and 6–10.

Also, since swelling of a lithium battery is suppressed, percentage of poor quality lithium battery can be considerably reduced.

Although the preferred embodiments of the present invention have been described, it will be understood by those skilled in the art that the present invention should not be limited to the described preferred embodiments, but various changes and modifications can be made within the spirit and scope of the present invention as defined by the appended claims.

What is claimed is:

1. A lithium battery comprising:
   an anode;
   a cathode comprising a compound capable of intercalating and deintercalating lithium;
   a separator interposed between the cathode and the anode; and
   an electrolyte solution having an electrolyte solute dissolved in a nonaqueous solvent, the nonaqueous solvent comprising a mixed solvent containing 8 to 15% by volume of ethylene carbonate, 10 to 35% by volume of γ-butyrolactone, 35 to 65% by volume of at least one linear carbonate selected from the group consisting of dimethyl carbonate, diethyl carbonate, ethylmethyl carbonate, methylpropyl carbonate, ethylpropyl carbonate and methylbutyl carbonate and 8 to 15% by volume of

TABLE 1

| | Composition of nonaqueous solvent (ml) | | | | | | | | | |
| --- | --- | --- | --- | --- | --- | --- | --- | --- | --- | --- |
| | EC | GBL | EMC | DMC | FB | PC | VC | VS | ISO | Lithium salt |
| Example 1 | 15 | 25 | 50 | — | 10 | — | 2 | — | — | LiPF$_6$ (1.0 M) |
| Example 2 | 15 | 25 | 45 | — | 10 | 5 | 2 | — | — | " |
| Example 3 | 15 | 25 | 40 | — | 10 | 10 | 2 | — | — | " |
| Example 4 | 15 | 25 | 50 | — | 10 | — | 1.5 | — | 0.1 | " |
| Example 5 | 15 | 15 | 60 | — | 10 | — | 1.5 | — | 0.35 | " |
| Example 6 | 12 | 18 | 30 | 27 | 8 | 5 | 2 | 0.7 | — | " |
| Example 7 | 8 | 22 | 30 | 22 | 8 | 10 | 2 | 0.35 | — | " |
| Example 8 | 10 | 35 | 40 | — | 7 | 8 | 2 | 0.2 | — | " |
| Example 9 | 15 | 25 | — | 50 | 10 | — | 2 | — | — | " |
| Comparative Example 1 | 15 | 25 | 50 | — | 10 | — | — | — | — | " |
| Comparative Example 2 | 15 | 25 | 45 | — | 10 | 5 | — | — | — | " |
| Comparative Example 3 | 15 | 25 | 40 | — | 10 | 10 | — | — | — | " |
| Comparative Example 4 | 23.1 | 23.1 | 38.5 | 7.7 | 7.6 | — | — | — | — | " |
| Comparative Example 5 | 30 | — | 55 | — | 10 | 5 | — | 0.55 | — | " |
| Comparative Example 6 | 25 | 75 | — | — | — | — | 2 | — | — | " |
| Comparative Example 7 | 5 | 95 | — | — | — | — | 2 | — | — | " |
| Comparative Example 8 | 55 | 45 | — | — | — | — | 2 | — | — | " |
| Comparative Example 9 | 40 | 10 | — | 40 | — | — | — | — | — | " |
| Comparative Example 10 | 40 | 10 | — | 40 | — | — | 2 | — | — | " |

As described above, a lithium battery according to the present invention satisfies various characteristics required for lithium batteries that can be commercially acceptable, that is, extended charge/discharge cycle life, improved high-temperature storage stability and improved low-temperature discharge characteristics while using a non-aqueous solvent containing ethylene carbonate in a small amount of not more than 15% by volume.

fluorobenzene, and 0.5 to 9 parts by volume of vinylene carbonate based on 100 parts by volume of the mixed solvent.

2. The lithium battery of claim 1, further comprising 8 to 15% by volume of at least one selected from the group consisting of propylene carbonate, 1,2-butylene carbonate, 2,3-butylene carbonate, 1,2-pentene carbonate and 2,3-pentene carbonate.

3. The lithium battery of claim 1, wherein said anode comprises carbon material.

4. The lithium battery of claim 1, wherein the amount of the vinylene carbonate is 1 to 3 parts by volume based on 100 parts by volume of the mixed solvent.

5. The lithium battery of claim 1, wherein the compound capable of intercalating and deintercalating lithium is at least one selected from the group consisting of sulfur, a sulfur-containing compound, lithium composite oxide, a compound represented by $Li_xMO_2$, and a compound represented by $Li_yM_2O_4$, where M is a transition element, $0 \leq x \leq 1$ and $0 \leq y \leq 2$.

6. The lithium battery of claim 1, wherein the compound capable of intercalating and deintercalating lithium is at least one selected from the group consisting of $LiCoO_2$, $LiMnO_2$, $LiNiO_2$, $LiCrO_2$ and $LiMn_2O_4$.

7. The lithium battery of claim 1, wherein the electrolyte solute is selected from the group consisting of $LiPF_6$, $LiBF_4$, $LiClO_4$, $LiCF_3SO_3$, $LiC_4F_9SO_3$, $LiN(CF_3SO_2)_2$ and $LiAsF_6$.

8. The lithium battery of claim 1, wherein the concentration of the electrolyte solute is in a range of 0.8 to 2.5 M.

9. A lithium battery comprising:
an anode;
a cathode comprising a compound capable of intercalating and deintercalating lithium;
a separator disposed between the anode and the cathode; and
an electrolyte solution comprising an electrolyte solute dissolved in a nonaqueous solvent, the nonaqueous solvent comprising a mixed solvent containing 8 to 15% by volume of ethylene carbonate, 10 to 35% by volume of γ-butyrolactone, 35 to 65% by volume of linear carbonate selected from the group consisting of dimethyl carbonate, diethyl carbonate, ethylmethyl carbonate, methylpropyl carbonate, ethylpropyl carbonate and methylbutyl carbonate, and 8 to 15% by volume of fluorobenzene, 0.5 to 9 parts by volume of vinylene carbonate based on the volume of the mixed solvent, and 0.05 to 5 parts by volume of vinyl sulfone, isooxazole or a mixture thereof based on 100 parts by volume of the mixed solvent.

10. The lithium battery of claim 9, further comprising 8 to 15% by volume of at least one selected from the group consisting of propylene carbonate, 1,2-butylene carbonate, 2,3-butylene carbonate, 1,2-pentene carbonate and 2,3-pentene carbonate.

11. The lithium battery of claim 9, wherein the amount of vinylene carbonate is 1 to 3 parts by volume based on 100 parts by volume of the mixed solvent and the amount of vinyl sulfone, isooxazole or a mixture thereof is 0.07 to 2 parts by volume based on 100 parts by volume of the mixed solvent.

12. The lithium battery of claim 1, wherein said anode comprises carbon material.

13. The lithium battery of claim 9, wherein the compound capable of intercalating and deintercalating lithium is selected from the group consisting of sulfur, a sulfur-containing compound, lithium composite oxide, a compound represented by $Li_xMO_2$, and a compound represented by $Li_yM_2O_4$, where M is a transition element, $0 \leq x \leq 1$ and $0 \leq y \leq 2$.

14. The lithium battery of claim 9, wherein the compound capable of intercalating and deintercalating lithium is at least one selected from the group consisting of $LiCoO_2$, $LiMnO_2$, $LiNiO_2$, $LiCrO_2$ and $LiMn_2O_4$.

15. The lithium battery of claim 9, wherein the electrolyte solute is selected from the group consisting of $LiPF_6$, $LiBF_4$, $LiClO_4$, $LiCF_3SO_3$, $LiC_4F_9SO_3$, $LiN(CF_3SO_2)_2$ and $LiAsF_6$.

16. The lithium battery of claim 9, wherein the concentration of the electrolyte solute is in a range of 0.8 to 2.5 M.

17. An electrolyte for a lithium battery, comprising:
a nonaqueous solvent comprising a mixed solvent containing 8 to 15% by volume of ethylene carbonate, 10 to 35% by volume of γ-butyrolactone, 35 to 65% by volume of at least one linear carbonate selected from the group consisting of dimethyl carbonate, diethyl carbonate, ethylmethyl carbonate, methylpropyl carbonate, ethylpropyl carbonate and methylbutyl carbonate, and 8 to 15% by volume of fluorobenzene;
0.5 to 9 parts by volume of vinylene carbonate based on 100 parts by volume of the mixed solvent; and
an electrolyte solute dissolved in said nonaqueous solvent.

18. The electrolyte of claim 17, further comprising 8 to 15% by volume of at least one selected from the group consisting of propylene carbonate, 1,2-butylene carbonate, 2,3-butylene carbonate, 1,2-pentene carbonate and 2,3-pentene carbonate.

19. The electrolyte of claim 17, further comprising 0.05 to 5 parts by volume of vinyl sulfone, isooxazole or a mixture thereof based on 100 parts by volume of the mixed solvent.

20. The electrolyte of claim 19, further comprising 8 to 15% by volume of at least one selected from the group consisting of propylene carbonate, 1,2-butylene carbonate, 2,3-butylene carbonate 1,2-pentene carbonate and 2,3-pentene carbonate.

* * * * *